United States Patent
Goldberg

(10) Patent No.: US 7,031,925 B1
(45) Date of Patent: Apr. 18, 2006

(54) METHOD AND APPARATUS FOR CREATING CUSTOMER SPECIFIC DYNAMIC GRAMMARS

(75) Inventor: Randy G. Goldberg, Princeton, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/097,770

(22) Filed: Jun. 15, 1998

(51) Int. Cl.
*G10L 21/00* (2006.01)

(52) U.S. Cl. .................. 704/275; 704/270; 704/270.1; 704/9; 704/257; 704/231

(58) Field of Classification Search .................. 701/1, 701/10; 379/88; 704/275, 231, 257, 1, 9, 704/10, 270.1
See application file for complete search history.

(56) References Cited

U.S. PATENT DOCUMENTS

| | | | |
|---|---|---|---|
| 3,988,715 A | 10/1976 | Mullan et al. | |
| 4,817,156 A | 3/1989 | Bahl et al. | 704/256 |
| 5,050,215 A | 9/1991 | Nishimura | 704/244 |
| 5,101,345 A | 3/1992 | MacPhail | 707/1 |
| 5,179,718 A | 1/1993 | MacPhail | 707/514 |
| 5,418,717 A | 5/1995 | Su et al. | 364/419.08 |
| 5,465,290 A | 11/1995 | Hampton et al. | |
| 5,577,164 A | 11/1996 | Kaneko et al. | |
| 5,613,109 A | 3/1997 | Yamauchi et al. | |
| 5,642,519 A | 6/1997 | Martin | |
| 5,655,058 A | 8/1997 | Balasubramanian et al. | 704/236 |
| 5,677,990 A | 10/1997 | Junqua | |
| 5,680,511 A | 10/1997 | Baker et al. | 395/2.66 |
| 5,729,656 A | 3/1998 | Nahamoo et al. | 704/254 |
| 5,748,840 A | 5/1998 | La Rue | |
| 5,769,527 A | 6/1998 | Taylor et al. | 362/85 |
| 5,781,882 A | 7/1998 | Davis et al. | 704/221 |
| 5,794,042 A | 8/1998 | Terada et al. | |
| 5,797,123 A | 8/1998 | Chou et al. | |
| 5,799,269 A | 8/1998 | Schabes et al. | |
| 5,802,205 A | 9/1998 | Emico et al. | 382/187 |
| 5,806,040 A | 9/1998 | Vensko | |
| 5,818,952 A | 10/1998 | Takenouchi et al. | |
| 5,829,000 A | 10/1998 | Huang et al. | 704/252 |
| 5,841,901 A | 11/1998 | Arai et al. | |
| 5,850,480 A | 12/1998 | Scanlon | |
| 5,870,492 A | 2/1999 | Shimizu et al. | |
| 5,875,108 A | 2/1999 | Hoffberg et al. | 364/146 |
| 5,889,897 A | 3/1999 | Medina | 382/309 |
| 5,903,864 A | 5/1999 | Gadbois et al. | |
| 5,991,720 A * | 11/1999 | Galler et al. | 704/256 |

FOREIGN PATENT DOCUMENTS

| | | |
|---|---|---|
| EP | 0 319 193 A2 | 6/1989 |
| WO | WO 96 10795 | 4/1996 |
| WO | 96 36042 | 11/1996 |

* cited by examiner

*Primary Examiner*—Richemond Dorvil
*Assistant Examiner*—Lamont Spooner

(57) ABSTRACT

A method and apparatus create a dynamic grammar pertaining to a current user from a global database of data items. A user first identifies himself to the system using a predetermined input identifier, such as an account number, for example. On the basis of this input identifier, the system of the present invention extracts from a global customer database those data items that are associated with the input identifier of the customer. A dynamic grammar including these extracted data items is created, and the system performs a search for a particular data item within this dynamic grammar on the basis of further search criteria that are provided by the customer.

13 Claims, 5 Drawing Sheets

FIG. 2

| GENERIC NAME | SPECIFIC NAME |
|---|---|
| PHONE COMPANY | AT&T |
| GAS COMPANY | PSE&G |
| DEPARTMENT STORES | MACY'S<br>J.C. PENNEY<br>NORDSTROM |
| BANKS | PNC BANK<br>CITIBANK |
| BROKER | CHARLES SCHWAB |
| VISA | CITIBANK VISA<br>PNC VISA |
| MASTERCARD | NATWEST MASTERCARD |

METHOD AND APPARATUS FOR CREATING CUSTOMER SPECIFIC DYNAMIC GRAMMARS

CROSS REFERENCE TO RELATED APPLICATIONS

The present application is related to the following applications: U.S. patent application Ser. No. 08/763,382, filed Dec. 13, 1996, entitled "STATISTICAL DATABASE CORRECTION OF ALPHANUMERIC ACCOUNT NUMBERS FOR SPEECH RECOGNITION AND TOUCH-TONE RECOGNITION"; U.S. patent application Ser. No. 08/771,356, filed Dec. 16, 1996, entitled "CONSTRAINED ALPHA-NUMERICS FOR ACCURATE ACCOUNT NUMBER RECOGNITION"; U.S. patent application Ser. No. 08/909,199, filed Aug. 11, 1997, entitled "A CONFUSION MATRIX BASED METHOD AND SYSTEM FOR CORRECTING MISRECOGNIZED WORDS APPEARING IN DOCUMENTS GENERATED BY AN OPTICAL CHARACTER RECOGNITION TECHNIQUE"; U.S. patent application Ser. No. 08/909,200, filed Aug. 11, 1997, entitled "METHOD AND APPARATUS FOR PERFORMING AN AUTOMATIC CORRECTION OF MISRECOGNIZED WORDS PRODUCED BY AN OPTICAL CHARACTER RECOGNITION TECHNIQUE BY USING A HIDDEN MARKOV MODEL BASED ALGORITHM"; U.S. patent application Ser. No. 08/953,579, filed Oct. 17, 1997, entitled "METHOD AND APPARATUS FOR ACCESSING PRE-DEFINED GRAMMARS"; U.S. patent application Ser. No. 08/953,469, filed Oct. 17, 1997, entitled "METHOD AND APPARATUS FOR MINIMIZING GRAMMAR COMPLEXITY"; U.S. patent application Ser. No. 08/953,468, filed Oct. 17, 1997, entitled "METHOD AND APPARATUS FOR PERFORMING A GRAMMAR-PRUNING OPERATION"; U.S. patent application Ser. No. 08/975,587, filed Nov. 20, 1997, entitled "METHOD AND APPARATUS FOR PERFORMING A NAME ACQUISITION BASED ON SPEECH RECOGNITION"; U.S. patent application Ser. No. 08/975,588, filed Nov. 20, 1997, entitled "CONFUSION SET-BASED METHOD AND APPARATUS FOR PRUNING A PREDETERMINED ARRANGEMENT OF INDEXED IDENTIFIERS"; U.S. patent application Ser. No. 08/975,589, filed Nov. 20, 1997, entitled "CHECK-SUM BASED METHOD AND APPARATUS FOR PERFORMING SPEECH RECOGNITION"; U.S. patent application Ser. No. 08/982,678, filed Dec. 2, 1997, entitled "METHOD AND APPARATUS FOR ACCESSING A SYSTEM ON THE BASIS OF PLURAL MATCHING OPERATIONS"; U.S. patent application Ser. No. 09/018,449, filed Feb. 4, 1998, entitled "STATISTICAL OPTION GENERATOR FOR ALPHA-NUMERIC PRE-DATABASE SPEECH RECOGNITION CORRECTION"; and U.S. patent application Ser. No. 09/018,575, filed Feb. 5, 1998, entitled "A CONFUSION SET BASED METHOD AND SYSTEM FOR CORRECTING MISRECOGNIZED WORDS APPEARING IN DOCUMENTS GENERATED BY AN OPTICAL CHARACTER RECOGNITION TECHNIQUE".

BACKGROUND OF THE INVENTION

The present invention is directed to a method and apparatus for creating a dynamic grammar and, in particular, to a method and apparatus that creates such a dynamic grammar in accordance with an externally provided set of criteria.

As computers become more sophisticated, both in the ever-increasing amount of data they can store and process and in the ever-increasing speed at which they communicate with one another, certain institutions have begun to automate those tasks that had heretofore required labor-intensive efforts to accomplish. One such task is processing bill payments from customers. Although companies have for some time now employed large databases to keep track of their customer accounts, most companies still manage their account receivables by printing and mailing out paper bills. This traditional bill payment system has worked quite well in the past but is beginning to burst at the seams with the huge increases in mail volume that occur each year. As the postal service creaks and buckles under this perpetual avalanche of paper, the likelihood of mail being lost, misdelivered, or at least delayed increases. Moreover, as successful companies add more people to their customer rolls, the task of handling paper bills for each of these customers requires companies to spend more money to hire more people and machines to handle outgoing and incoming bills.

Attempts by companies to reduce the enormous volume of paper they must print and mail to customers has prompted some to allow customers to send bill payments electronically. Certain of these automated bill payment systems allow customers to access a company's bill payment system either through a computer or through a conventional telephone. Once a customer is connected to a particular company, he can authorize his bank to send payment to the company; thus, the company can receive payments in a more timely manner and at the same time reduce the expenses that are associated with a paper-based billing system. The drawback, however, is that most customers have several bills to pay each month. If a customer wishes to pay all of his bills electronically, the customer would have to initiate a separate communication with each company to which he intends to send payment. For those people who send monthly bills to several different companies, the task of calling or logging on to each company on a separate basis discourages customers from using a system that if used widely would reduce the reliance on paper, reduce the pressure on our postal service, and provide customers as a whole the near-instantaneous certainty that their payments have been properly credited to their accounts. In order to address this concern, several banks allow customers to log into their computer systems and direct payments to those companies that participate in the bank's electronic bill payment system. Although customers can pay several different bills from one electronic "location" with this type of system, such systems may be prone to delays in accessing the pre-stored computer files relating to the desired recipient company if the number of participating companies becomes excessively large. When such a system must keep track of an excessively large amount of companies, the time needed for the system to respond to a customer's request to send payment is slowed by the cumbersome search the system must perform among the many thousands of entries in its database. Furthermore, given a system that stores thousands of company names, if a user can identify a company to receive payment by speaking the company name, the chance of the system confusing acoustically similar company names (e.g., "AT&T" with "NT&T") is great, especially if the system must search through the entire company database in order to match the user-provided input. What is therefore needed is a system that would, instead of conducting such a global database search in order to access a desired data item stored therein, first creates a dynamic grammar that is limited to those data items pertaining to a current customer's account and then conduct the search for the intended recipient of the customer's communication among the data items within this grammar alone.

SUMMARY OF THE INVENTION

In order to overcome the above-mentioned drawbacks of previous automated bill payment systems, the present invention stores in one system the identities of as many companies as each customer would like to pay on an electronic basis. Thus, each customer, when he or she enrolls in a system employing the principles of the present invention, would register each company to which he wishes to send payments electronically. Each company to which payments may be sent electronically would be associated with at least one unique identifier, each such identifier corresponding to a customer who has selected the associated company to receive payments electronically from his account. The system would maintain this master list of companies and associated unique identifiers in a database. When a particular customer wishes to pay a bill, the customer would enter the unique identifier; on the basis of this identifier, the present invention would create a dynamic grammar, or collection, comprising only those companies that are associated with the entered input identifier. Apart from the input identifier provided by the customer, each company may be identified by such identifiers as generic identifiers or specific identifiers. Generic identifiers cover general classes of companies, such as telephone companies or credit card companies. Specific identifiers correspond not only to the company name itself, but also to any other moniker by which the company may be referred to, such as, for example, "Big Blue" for IBM. Once a dynamic grammar is created for a particular customer, the customer can direct payment to any combination of companies merely by identifying the companies that are to receive payment. Since each dynamic grammar includes only those companies that the associated user has previously enrolled, the customer need not use a company's specific name to identify it as an intended recipient of a payment; instead, if, for example, the dynamic grammar includes a single phone company for a particular customer, the customer may direct payment to such a company merely by entering a command such as "pay phone company" instead of providing the actual name of the company itself. If the dynamic grammar includes more than one specific company under a generic company category, the system may prompt the customer with each specific company in this category until the customer selects the intended company. Even in this situation, the system would save time over previously proposed systems since it would not have to search for each company that is categorized within the generic category provided by the customer; instead, out of all those companies that are categorized within this generic category, the system of the present invention would need to present to the user only those companies that the customer specifically enrolled previously.

BRIEF DESCRIPTION OF THE DRAWINGS

FIG. 2 illustrates an exemplary arrangement of data items that includes those data items in a dynamic grammar.

DETAILED DESCRIPTION

Figure 1:
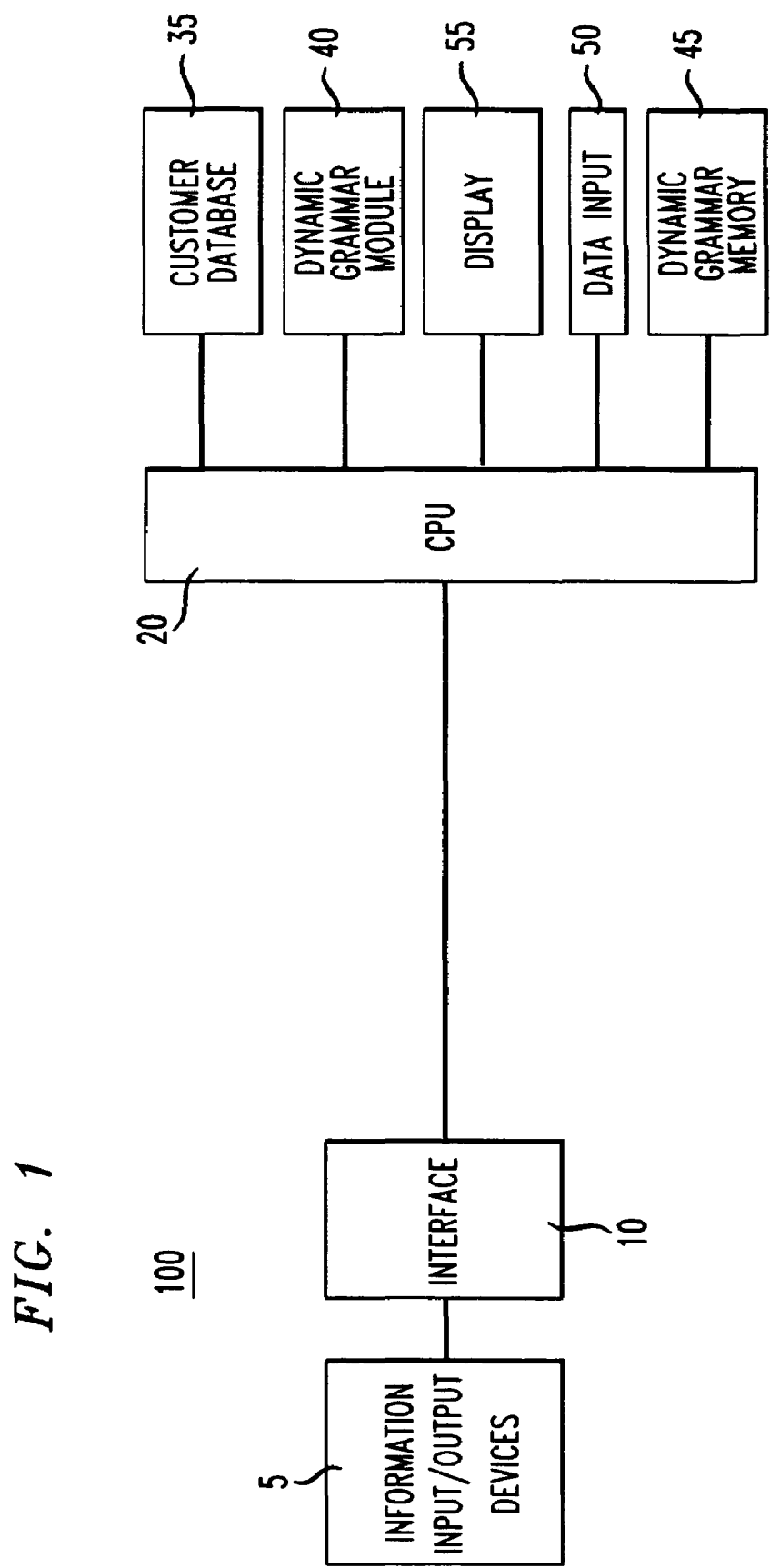
FIG. 1 illustrates a system for creating a dynamic grammar in accordance with the present invention.

FIG. 1 illustrates a system 100 that operates according to the principles of the present invention. System 100 includes an information input/output device 5, which may comprise any suitable device by which a user may convey and receive information. Thus, information input/output device may comprise, for example, a telephone, a keyboard/display combination, or a touch-responsive screen. The information input/output device 5 is coupled to a CPU 20. If CPU 20 is remotely located from device 5, the connection may be made through any suitable interface 10. This wired connection may comprise not only telephone lines or coaxial cables, but also fiber optic communication media as well. Instead of arranging the CPU 20 and device 5 at separate locations, however, system 100 may also be embodied as a unitary device in which all the components therein are encased within a common housing. Moreover, the information input/output device 5 need not be coupled to the CPU 20 through a wired connection; communication between these components may be achieved through wireless means as well. Thus, information input/output device 5 and CPU 20 may be equipped or associated with radio, cellular, or infrared transmission technology, and this wireless information transmission may be in digital or analog form. If the wireless transmissions are analog, then system 100 would also be equipped with suitable A/D and D/A converters to allow the CPU 20 and related components to process the information contained in such transmissions. Associated with CPU 20 are a customer database 35, a dynamic grammar memory 45, and a dynamic grammar module 40. Also coupled to CPU 20 are a data input device 50, which may comprise a keyboard, mouse, CD-ROM or DVD drive, or any other suitable means for entering data into system 100, and a display 55.

Figure 3:
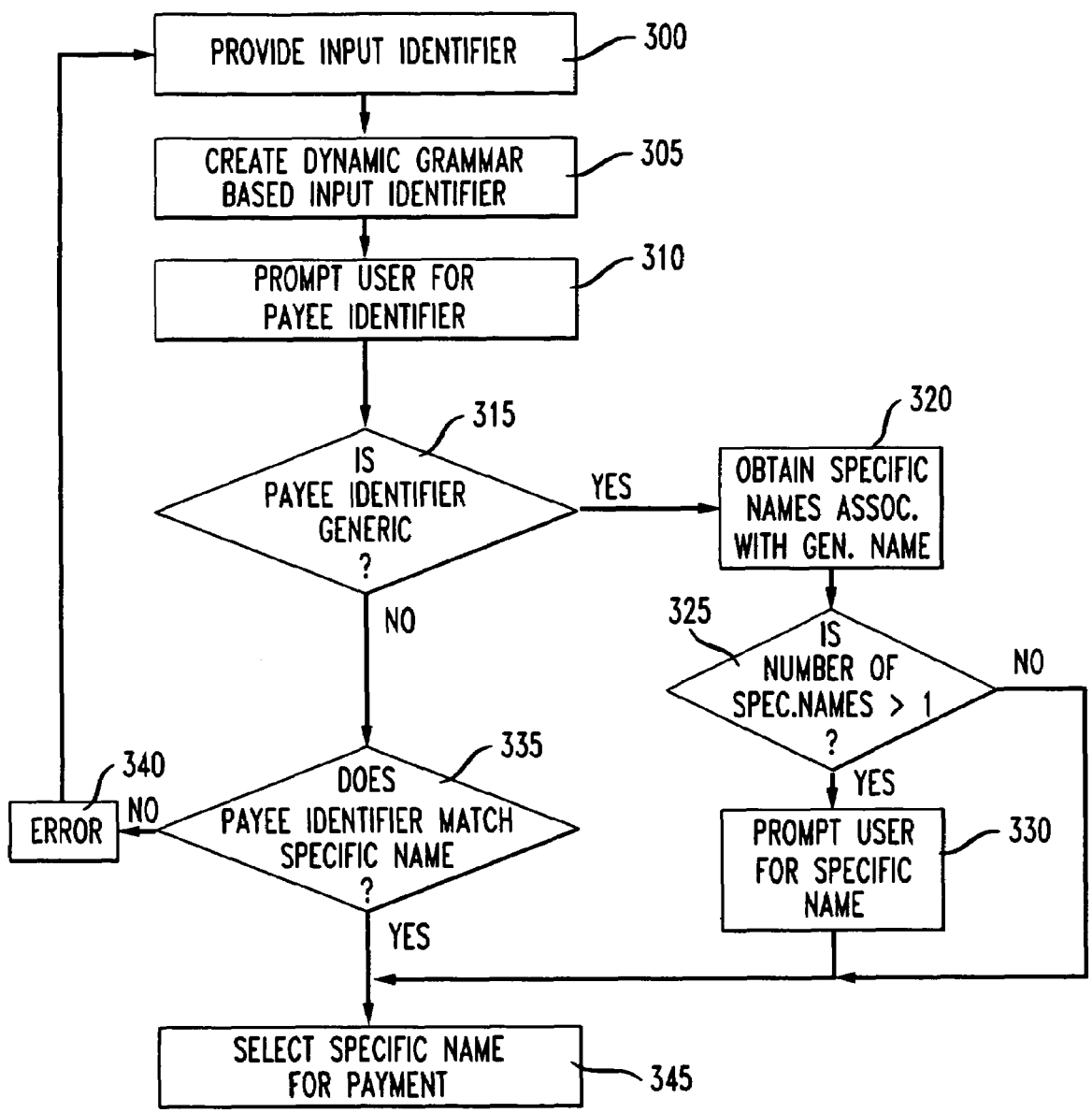
FIG. 3 illustrates a flow diagram in accordance with a first embodiment of the present invention.

The flow chart of FIG. 3 illustrates the operation of CPU 20 in accordance with the dynamic grammar creation routine maintained in module 40. The operation of system 100 shall be explained within the context of an automated bill payment system, although the present invention is not limited thereto. A customer who has an account at a bank would enroll in such a system by listing all the participating companies to which electronic bill payments are to be sent at his direction. For example, the customer may provide the bank with the names of his telephone company, gas company, credit card companies, and department store companies. The information provided by the customer is entered into customer database 35 and associated with his particular account number through data input device 50. The database 35 includes similar information for each other customer who has enrolled in this automated bill payment system. Thus, the database 35 may include a list of all the generic types of companies that can serve as payee companies, such as BANKS, TELEPHONE COMPANIES, CABLE TV COMPANIES, etc. Each generic class of company would include a list of specific participating companies that are properly classified within the generic class. Thus, the CABLE TV category in database 35 may be linked to such specific companies as TCI or COMCAST. Depending on the geographic reach of the customer base served by system 100, each generic category may include companies that operate within a particular city, state, region, or even country. In this possible arrangement of information in database 35, each specific company would be associated with the automated payment account numbers of those customers who intend to electronically send payments to such a company. Thus, the TCI cable TV company would be associated in database 35 with the account numbers of those TCI subscribers who wish to pay their cable TV bills automatically through system 100.

Returning to FIG. 3, when a customer wishes to pay a particular bill, the customer accesses the bank through information input/output device 5. The customer then provides his bank account number through device 5 (step 300). This account number may be referred to as an input identifier. For purposes of this discussion, the term "identifier" refers to any aggregation of letters, numbers, or typographic characters; an identifier may comprise either an actual word or a non-word. For manifestations of system 100 that require users to enter information by speaking it, the identifiers may be pronounced as a whole word or on a character-by-character basis. Thus, if an identifier comprises "JOHN", a user may provide this identifier to device 5 (if it comprises a voice input/output device) either by pronouncing the whole word, or by pronouncing the characters individually, as in J-O-H-N. The input identifier is conveyed to CPU 20 through interface 10. CPU 20 then uses the received account number to access from database 35 the associated payee companies, organized according to their proper generic class, originally supplied by the customer during enrollment. CPU 20 pulls this information from database 35 and supplies this information to memory 45, thus creating a dynamic grammar for this particular transaction (step 305). As used herein, the term "grammar" relates to a collection of various data items, and the term "dynamic grammar" refers to a grammar that has been generated on a real-time basis in response to input information provided by a customer operating device 5.

An example of a dynamic grammar is illustrated in the table of FIG. 2. Although the identifiers listed herein correspond to only one particular customer, the system 100 is capable of creating as many of these dynamic grammars as there are account numbers. In this arrangement of identifiers, the left-hand side of the table refers to generic identifiers, such as PHONE COMPANY, GAS COMPANY, BANKS, etc. Associated with each generic identifier is at least one specific identifier, which identifies a particular payee of the customer. In the example of FIG. 2, the phone company is AT&T; the gas company is PSE&G; and the banks are PNC and CITIBANK. It should be noted that the dynamic grammar includes only those generic and specific identifiers for which the particular customer has registered; it does not include all of the possible generic identifiers maintained in database 35. Instead, the dynamic grammar omits those company types and names that the customer did not register with his account. Thus, even though database 35 includes a generic identifier for WATER COMPANY and allows customers to register their own particular water companies in this category, if a particular customer did not register any water company with his account, then the dynamic grammar created for that customer will not include a WATER COMPANY generic identifier. For a given generic identifier, multiple associated payee identifiers may correspond not only to separate payees, but also to different ways of referring to the same payee company. For example, in the PHONE COMPANY category, multiple specific identifiers such as AT&T and BELL ATLANTIC would obviously refer to separate companies, but multiple specific identifiers such as AT&T and AMERICAN TELEPHONE AND TELEGRAPH would refer to the same company. By taking into account multiple ways of referring to the same company, the system 100 provides the user with the flexibility of referring to a company by any one of several ways. This added flexibility also relieves the user from having to remember a specific way to refer to a company; all that is required is that the user remember one of several ways of identifying a company. Of course, the table arrangement seen in FIG. 2 is not the only way to arrange the payee identifiers for a particular customer. The dynamic grammar memory 45 and the customer database 35 is capable of arranging such information according to other suitable data structures such as linked lists, arrays, or hash tables.

After system 100 creates a dynamic grammar for a customer in memory 45, the user is prompted to provide information identifying a payee company that the user desires to pay (step 310). If the user is accessing CPU 20 through a telephone, the prompt may be provided by any suitable voice prompt device; if the user is accessing CPU 20 with a keyboard/display combination, the prompt requesting the payee identity would be transmitted to the display. The selection provided by the user is referred to as a payee identifier and, depending on the information input/output device 5, it may be provided by manipulating a set of keys, by pronouncing the payee name, or by touching a combination of certain regions on a touch screen surface, for example. Once the payee identifier is received at CPU 20, CPU 20 determines whether the payee identifier corresponds to a generic name of the dynamic grammar in memory 45 (step 315). This search takes into account the possibility that instead of entering information specifically identifying a particular company, the user provides some type of generic description of the desired company. Thus, if the user wants to pay AT&T, he may enter into device 5 information that only identifies the desired payee company as "PHONE COMPANY". If the user does indeed enter such generic information into device 5, CPU 20 obtains the specific payee identifiers associated with the generic description provided by the user (step 320). If the number of specific payee company identifiers is only one (step 325), then CPU 20 selects that single, associated payee company for payment. System 100 would then authorize, according to any suitable means, the financial institution associated with system 100 to transfer funds from the user's account to the payee company selected in step 345.

If in step 325 more than one payee identifier is associated with the generic payee identifier provided by the user, CPU 20 prompts the user with each of these specific payee identifiers until the user acknowledges one of them as the desired payee (step 330). Thus, if the user enters a generic payee identifier such as VISA, CPU 20 would prompt the user with CITIBANK VISA and PNC VISA in order to require the user to select one of these institutions as the desired payee. Of course, if the user originally entered a specific payee identifier, then CPU 20 would directly implement the payment step (step 345) without having to first find a generic payee identifier and then an associated specific payee identifier. Additionally, if the identifier information originally entered by the user at step 300 does not match any particular generic or specific identifier maintained at dynamic grammar memory 45, CPU 20 may issue an error message and reprompt the user for the input identifier (i.e., account number) again. This would require system 100 to recreate a dynamic grammar. Alternatively, instead of creating a dynamic grammar multiple times for the same user, the reprompt may instead require the user to enter another payee identifier, in which case the CPU 20 would use the newly entered payee identifier to search the dynamic grammar that was created when the user first accessed system 100.

Figure 4:
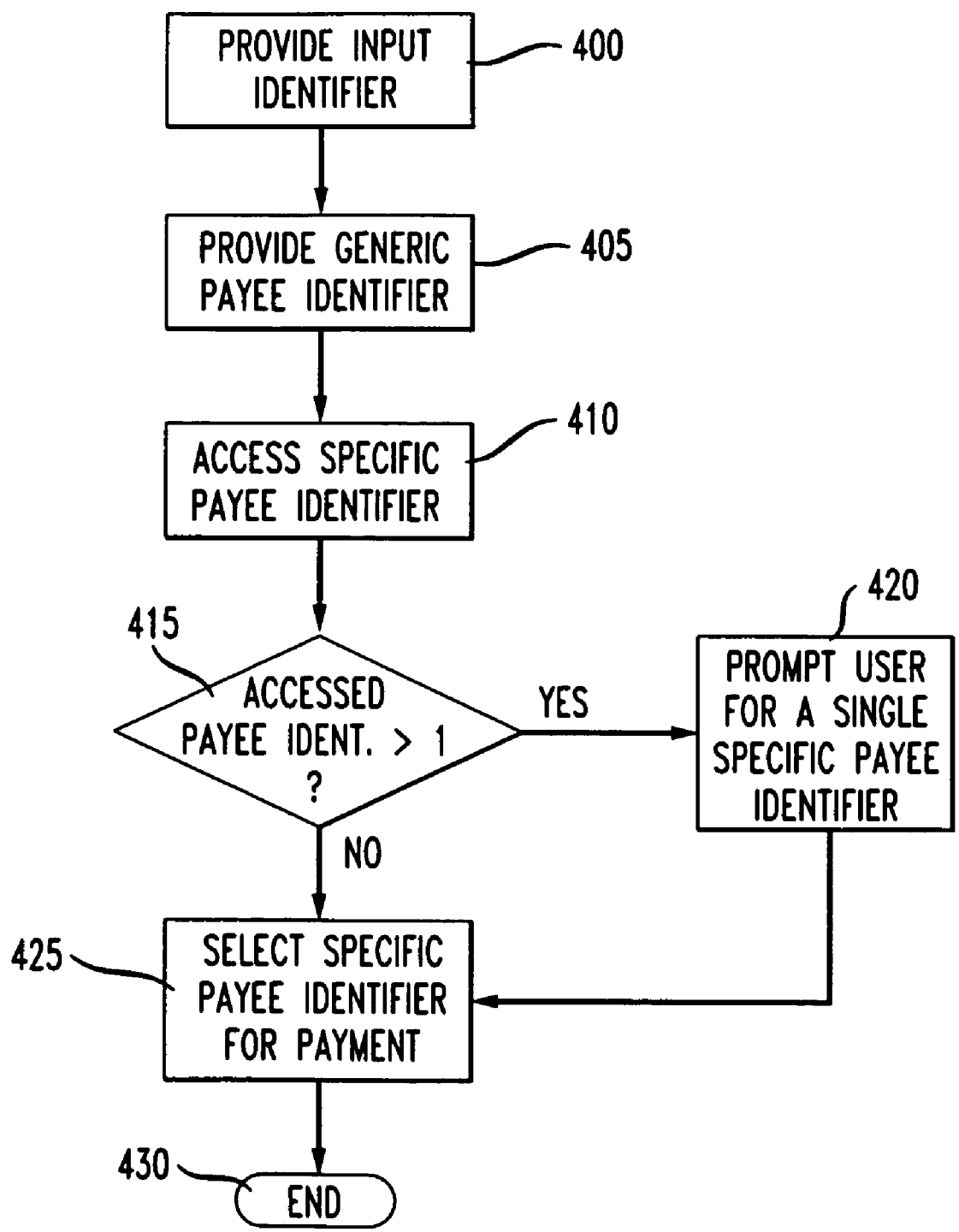
FIG. 4 illustrates a flow diagram in accordance with a second embodiment of the present invention.

Creating a dynamic grammar is not the only way to select a specific identifier. Instead, such information may be obtained directly from database 35. The particular manner in which such information may be obtained directly from database 35 is illustrated by the flow chart of FIG. 4. As with FIG. 3, the procedure of FIG. 4 begins when the user provides an input identifier to CPU 20 through information input/output device 5 (step 400). Within the context of an automated bill payment system, this input identifier may correspond to the user's bank account number. After receiving the account number, CPU 20 requires the user to enter a generic payee identifier, such as for example, GAS COMPANY or PHONE COMPANY (step 405). Once CPU 20 has obtained from the user an input identifier (identifying a particular account) and a generic payee identifier (identifying the type of company that is to receive payment), CPU 20 uses this information to obtain from database 35 those specific payee identifiers that are associated with the generic payee identifier of the account in question (step 410). As stated above, each user's account number is associated in database 35 with those companies to which he may direct electronic payments. Unlike the procedure outlined in FIG. 3, the specific payee identifiers are obtained according to the procedure of FIG. 4 without first creating a dynamic grammar that includes all the specific payee identifiers for that particular user. After pulling from database 35 those specific payee identifiers that are associated with the generic payee identifier provided by the user, CPU 20 determines whether the amount of accessed specific payee identifiers exceeds one (step 415). If the amount of specific payee identifiers exceeds one, then CPU 20 prompts the user in the same manner as discussed above to select one specific payee identifier (step 420). If only one specific payee identifier was associated with the generic payee identifier provided by the user, then that specific payee identifier is selected for payment (step 425).

Figure 5:
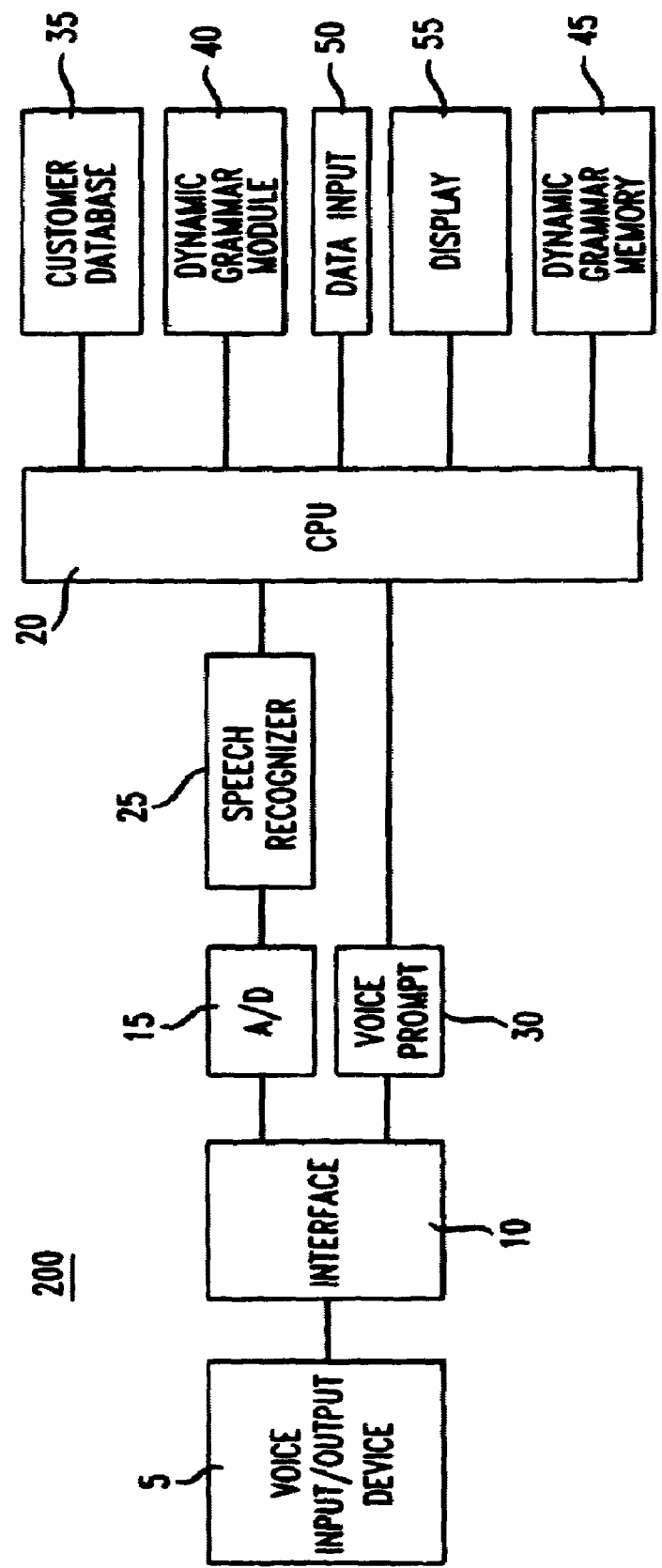
FIG. 5 illustrates another system for creating a dynamic grammar in accordance with the present invention.

As explained above, system 100 may be embodied in several possible ways. The system 100 may comprise a single, unitary device; it may use wireless communication techniques to convey information between the user and CPU 20, and it may use any one of several different types of information input/output devices. One example is illustrated in FIG. 5, which illustrates a system 200 that uses speech recognition to convey information from the user to CPU 20. System 200 includes a voice input/output device 5, which may comprise a conventional telephone or microphone. A user wishing to access CPU 20 in order to make a bill payment would be prompted to speak an input identifier into voice input/output device 5. For purposes of this discussion, the user shall be assumed to speak a valid input identifier into device 5. This voice signal can be carried over a telephone line to interface 10, which may comprise a public switched telephone network ("PSTN") and which interfaces the voice signal generated by voice input/output device 5 to the remaining components of system 200. Of course, as explained before, any suitable wired or wireless connection could convey the voice signal to the remaining components of system 200. System 200 further includes an A/D converter 15, which converts the analog voice signal provided by interface 10 into a digital signal. A/D converter 15 supplies the digitized voice signal to speech recognizer 25, which may comprise, for example, a HARK 3.0 recognizer, which is manufactured by BBN Co. After employing a recognition routine based on, for example, the Hidden Markov Model, speech recognizer 25 provides as an output a recognized identifier, which is intended to correspond to the identifier that the user spoke into the telephone. The recognized output is provided to an input of CPU 20, which then performs the company identification procedures outlined above in connection with FIGS. 3 and 4. CPU 20 is configured to determine whether the recognized identifier corresponds to any one of a plurality of valid identifiers stored in database 35, which may comprise a hard disk or any other suitable storage medium capable of storing a large number of account numbers. CPU 20 controls a voice prompt device 30, which may comprise DIALOGIC telephone interface cards. CPU 20 causes prompt device 30 to issue voice inquiries to a user at voice input/output device 5. For example, the voice prompt device 30 may issue such inquiries as "Please tell me your account number" and "Please tell me the name of the company that is to receive payment". As with system 100, system 200 also includes a data input device 50, such as a keyboard, a CD-ROM drive, or a floppy drive, and the system 200 is also provided with a display 55.

By using a system as embodied in accordance with the principles set forth above, a customer may facilitate the manner in which bill payments are made and ensure that such bill payments are received promptly. Moreover, by allowing users to identify a company by a generic identifier or by any one of a group of specific identifiers, the present invention avoids requiring users to remember one specific way by which a company must be properly identified. Thus, the ease of use that is thus presented by the principles of the present invention encourages users to enroll in such automated bill payment systems, with the result that bill payments are received not only with more speed than if normal postal services are used, but also with greater assurance that the bill payment will in fact be received by the payee, since the possibility of a bill payment being lost or otherwise misdirected while it is in electronic transit to the payee is much less than if a printed bill payment was sent using normal postal delivery. If enough users enroll in such a system, the pressure on our paper resources may also ease somewhat because payee institutions would not need to send out as many bills and their customers would not need to use as many printed checks.

The above described embodiments are illustrative of the principles of the present invention. Other embodiments could be devised by those skilled in the art without departing from the spirit and scope of the present invention.

The invention claimed is:

1. A method of creating a dynamic grammar from a predetermined arrangement of generic payee identifiers and specific payee identifiers, each specific payee identifier being associated with a generic payee identifier, the method comprising:

obtaining at least one generic payee identifier in accordance with a first type of predetermined criteria;

obtaining a specific payee identifier associated with each obtained generic payee identifier; and creating the dynamic grammar by arranging the obtained generic payee identifier and the obtained specific payee identifier in accordance with a predetermined configuration.

2. The method according to claim 1, wherein the first type of predetermined criteria is a customer account number, each generic payee identifier is associated with a particular customer account number, and said obtaining at least one generic payee comprises:

obtaining each generic payee identifier associated with the particular customer account number.

3. The method according to claim 2, wherein said obtaining a specific payee identifier includes determining at least one specific payee identifier associated with each generic payee identifier.

4. The method according to claim 1, wherein each generic payee identifier is associated with a plurality of specific payee identifiers.

5. The method according to claim 4, wherein each generic payee identifier corresponds to a category of payee companies and each specific payee identifier corresponds to a single payee company.

6. A method for facilitating an electronic payment using a system, the system including a database that includes a list of payee companies, the method comprising:
   (a) obtaining a customer specific identifier;
   (b) obtaining a first payee related identifier relating to at least one payee company from the database based on the customer specific identifier;
   (c) obtaining a second payee related identifier relating to at least one payee company, the second payee related identifier being associated with the first payee related identifier;
   (d) creating dynamic grammar from a predetermined arrangement of the obtained first payee related identifier and the obtained second payee related identifier.

7. The method according to claim 6, wherein said obtaining a second payee related identifier includes determining, based on the first payee related identifier, whether to obtain the second payee related identifier.

8. The method according to claim 6, wherein said first payee related identifier is a generic payee identifier, said generic payee identifier being associated with a plurality of the payee companies.

9. The method according to claim 8, wherein the second payee related identifier is a specific payee identifier, said specific payee identifier being associated with one of the payee companies.

10. The method according to claim 6, wherein said customer specific identifier is a customer account number.

11. An apparatus for reducing a predetermined collection of data items to a customized arrangement comprising a subset of said data items, comprising:
   a memory that stores the predetermined collection of data items;
   a processor coupled to the memory, the processor being responsive to a set of predetermined criteria;
   means for selecting at least one of the set of predetermined criteria, the means for selecting being coupled to the processor, the means for selecting including a first means for obtaining at least one generic payee identifier in accordance with the set of predetermined criteria and a second means for obtaining a specific payee identifier associated with each generic payee identifier associated with the first means for obtaining, the customized arrangement being part of a dynamic grammar that includes the at least one generic payee identifier and the associated specific payee identifier; and
   means, coupled to the processor, for controlling the processor to create the customized arrangement in accordance with the predetermined criteria associated with the means for selecting.

12. An apparatus for reducing a predetermined collection of data items to a customized arrangement comprising a subset of said data items, the data items including identification information for a plurality of payee companies, the apparatus comprising:
   a memory that stores the predetermined collection of data items, the data including identification information for a plurality of payee companies;
   a processor coupled to the memory, the processor being responsive to a set of predetermined criteria;
   means for selecting at least one of the set of predetermined criteria, the means for selecting being coupled to the processor, the means for selecting including a first means for obtaining at least one generic payee identifier in accordance with the set of predetermined criteria and a second means for obtaining a specific payee identifier associated with each generic payee identifier associated with the first means for obtaining, the customized arrangement being part of a dynamic grammar that includes the at least one generic payee identifier and the associated specific payee identifier; and
   means, coupled to the processor, for controlling the processor to create the customized arrangement in accordance with the predetermined criteria associated with the means for selecting.

13. The apparatus according to claim 12, wherein said generic payee identifier is associated with a plurality of payee companies and said specific payee identifier is associated with one of said plurality of payee companies.

* * * * *